April 10, 1951 J. H. HOPFFGARTEN 2,548,372

RADIO PHONOGRAPH ATTACHMENT

Filed Aug. 11, 1948 2 Sheets-Sheet 1

John H. Hopffgarten
INVENTOR.

BY Clarence A. O'Brien
and Harvey B. Jacobson
Attorneys

April 10, 1951 J. H. HOPFFGARTEN 2,548,372

RADIO PHONOGRAPH ATTACHMENT

Filed Aug. 11, 1948 2 Sheets-Sheet 2

John H. Hopffgarten
INVENTOR.

BY Clarence A. O'Brien
and Harvey B. Jacobson
Attorneys

Patented Apr. 10, 1951 2,548,372

UNITED STATES PATENT OFFICE 2,548,372

RADIO PHONOGRAPH ATTACHMENT

John H. Hopffgarten, Boise, Idaho

Application August 11, 1948, Serial No. 43,697

4 Claims. (Cl. 200—52)

This invention relates to novel and useful improvements in radio-phonograph equipment and the primary object of this invention is to supply an attachment rendering certain operations automatic.

Another object of this invention is to selectively render the radio reception section and radio audio section as well as the phonograph turntable motor and pickup mechanism inoperative upon completion of a single cycle of operation of the device, such as the completion of a single recording play back.

Another object of this invention is by means of the same attachment, to render solely the phonograph turntable motor and pickup device inoperative and simultaneously render the radio reception section operative, leaving the audio section uneffected.

The invention includes means for carrying out the above mentioned functions, and said means includes a latch mounted on the cabinet supporting the electrical equipment, the said latch having a bar forming a portion thereof and associated therewith, the bar being reciprocatable upon actuation of the latch by means of a spring urged construction; a first and second pivoted arm, the first arm having one mercury type switch mounted thereon and the second arm having two spaced mercury type switches thereon, the switches being in electrical connection with various appurtenances contiguous to the radio-phonograph combination, and a push rod rotatively and reciprocatively mounted in the cabinet being pivotally attached to one of the pivoted arms and being selectively seated on the other of the arms in order that selectivity may be arranged for pivotally actuating either one or both of said said pivoted arms.

Another purpose of this invention is to render it possible to play a recording by means of the audio section of the radio in conjunction with the phonograph turntable motor and pickup mechanism, after which one of two alternatives may be arranged. The first alternative is to render the entire apparatus inoperative electrically by means of breaking the main circuit of the radio-phonograph combination, while the second alternative is to render only the pickup mechanism and phonograph turntable motor inoperative in order that a pre-selected station of the radio portion of the device may be utilized, without the necessity of further adjustment to the device.

Another object of this invention is to perform the above mentioned functions by means of simplified apparatus which is adaptable for use in conjunction with various types of radio-phonograph combination sets.

And another purpose of this invention is to utilize either the complete combination or the sub-combination which includes only one portion of the apparatus, whether it be the portion for rendering the entire set inoperative or the portion for rendering only the radio reception section and audio section operative upon completion of a record playing cycle of operation.

Ancillary objects and features of novelty will become apparent to those skilled in the art, in following the description of the preferred form of the invention, illustrated in the accompanying drawings, wherein.

It is one of the intentions of this invention to provide such a device which may be in the nature of an attachment for existing radio-phonograph combination sets or may be incorporated in the original manufacture of sets to be made in the future. The attachment provides such a means when utilized in conventional apparatus that upon completion of a single cycle of operation which includes the complete playing of a conventional recording, one of two alternatives may take place. The first is to render the entire apparatus inoperative including both the radio reception section and the audio section of the radio, phonograph motor used for rotating the turntable and in instances wherein electrically operative pickup mechanisms are used, the said pickup mechanism. The second alternative is to render only the pickup mechanism inoperative (when electrically operative pickups are used) and the turntable motor. In this instance it is apparent that when the variable condensers are so arranged as to play a pre-selected station, this station will be received over the audio section and reception section of the radio.

The specific structure of the invention is shown for illustrative purposes in conjunction with a small conventional radio-phonograph set. This set includes a cabinet 10, a swinging arm 12 mounted thereon which incidentally supports one of the various conventional types of sound pickup mechanisms used in conjunction with phonographs.

Figure 1:
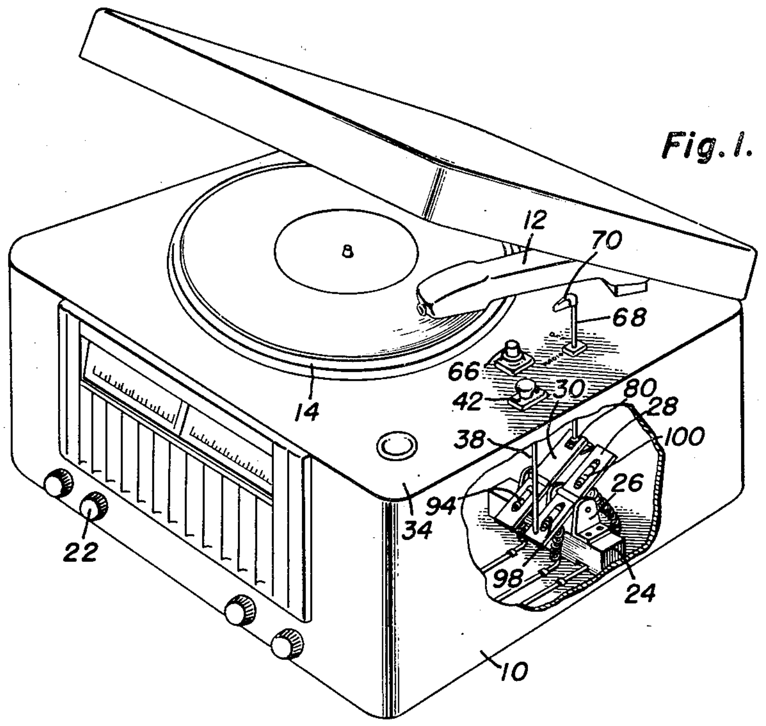
Figure 1 is a perspective view of the preferred form of the invention, showing the preferential environment of a conventional radio-phonograph apparatus.

A turntable 14 is illustrated and is actuated by the phonograph motor and mechanism seen at 16 in the wiring diagram. Further, the radio-phonograph set includes the radio reception section indicated at 18 and the radio audio section indicated at 20 which are electrically connected together by means of the usual wiring schematically shown in Figure 6. A conventional switch seen at 22 serves its usual function to switch from radio to phonograph and of course, the other knobs shown in Figure 1 serve their usual purpose for tuning, circuit making and breaking etc.

The above described mechanism is purely conventional being found in substantially all radio-phonograph combinations and of course, there is other mechanism which forms no portion of the present invention but is necessary for the operativeness of such devices. What I feel as my inventive portion of the apparatus is the attachment to be described at this time.

In a convenient location in the cabinet 10 there is a bearing block 24 which may be in any convenient location and may be of any suitable type. A bracket 26 is attached to the bearing block and has a pivot pin 29 extending therethrough in order to accommodate a first pivoted arm 28 and a second pivoted arm 30. A small spring 32 has one end attached to the bracket 26 while the other end reacts on the under surface of the arm 28. This of course normally biases the arm in a pivoted manner.

Figure 4:
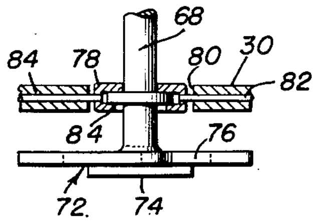
Figure 4 is a sectional view of the latch mechanism forming a portion of the invention.

Referring now to Figure 4 it will be seen that the top 34 of the cabinet 10 has a latch mechanism associated therewith. This latch mechanism may include a housing 36 secured to the undersurface of the top 34 and has a plunger or bar 38 reciprocatively received therein. A suitable knob 40 may be attached to one end thereof which projects above the upper surface of the top 34, seating on a wear plate 42. The opposite end of the said bar 38 rests on the pivoted arm 28 adjacent one end thereof.

A spring 44 or other suitable equivalent resilient urging means is attached at one end to a partition 46 in the housing and attached at the other end to the said bar 38. This spring ordinarily biases the bar 38 outwardly of the said housing, urging the bar knob 40 away from the upper surface of the cabinet.

A latching bit 48 is mounted in the housing 36 in a manner so that it will reciprocate transversely of the longitudinal axis of the bar 38. The end of the said latching bit 48 is sharpened in order to fit in one of a group of notches, each of which is indicated at 50 and each of which is provided in the bar 38. Thus, the spring 44 may be stretched when the bar 38 is pressed downwardly and the tension in the spring is maintained if the latching bit is seated in one of the notches 50. Upon removal of the latching bit 48 from the notches, the spring 44 will urge the bar upwardly, thereby allowing the spring 32 to force the arm 28 in a pivoted manner.

In order to regulate the latching bit 48, a cam type keeper 52 is supplied on a plunger 54 and both the plunger and cam type keeper 52 slide within an opening 56 provided in the said latching bit 48. The said cam 52 protrudes from one of the longitudinal surfaces of the plunger 54 and engages the side wall of the opening 56 in order to reciprocate the latching bit 48 slightly against the compressive force of a spring 58 which seats on a partition 60 of the housing 30 and also on a collar or the like 62 attached to the latching bit 48. Urging the button 66 attached to the plunger 54 and forming a portion thereof will of course, urge the cam 52 slightly thereby carrying the latching bit longitudinally slightly within the housing 36. This will disengage the end of the latching bit 48 with relation to one of the notches 50. Then, the spring 44 may become effective as described above and for the purpose described above.

The swingingly mounted arm 12 which carries the pickup mechanism normally swings to a position at rest away from the turntable upon completion of the transcription. This is effected by conventional means pertinent to various types of radio-phonograph sets and is not shown or described in detail. When the swing arm 12 rests on the button 66 the actuation of the latch is effected as described above.

Figure 5:
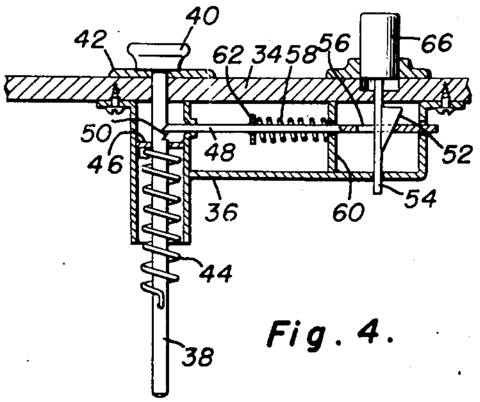
Figure 5 is a sectional view taken on the line 5—5 of Figure 3 and in the direction of the arrows.

A push rod 68 having an indicator 70 at the top thereof is reciprocatively and rotatively mounted in the top 34 of the case 10. A facing plate 72 is attached to the said top 34 and seats the indicator 70 when it is in the extreme depressed position. The function of this push rod is two fold. The first is to pivotally actuate the arm 30 and the second is to actuate the arm 28 simultaneously with the actuation of the arm 30. The means for carrying out this last mentioned function may be seen best in Figure 5.

Figure 2:
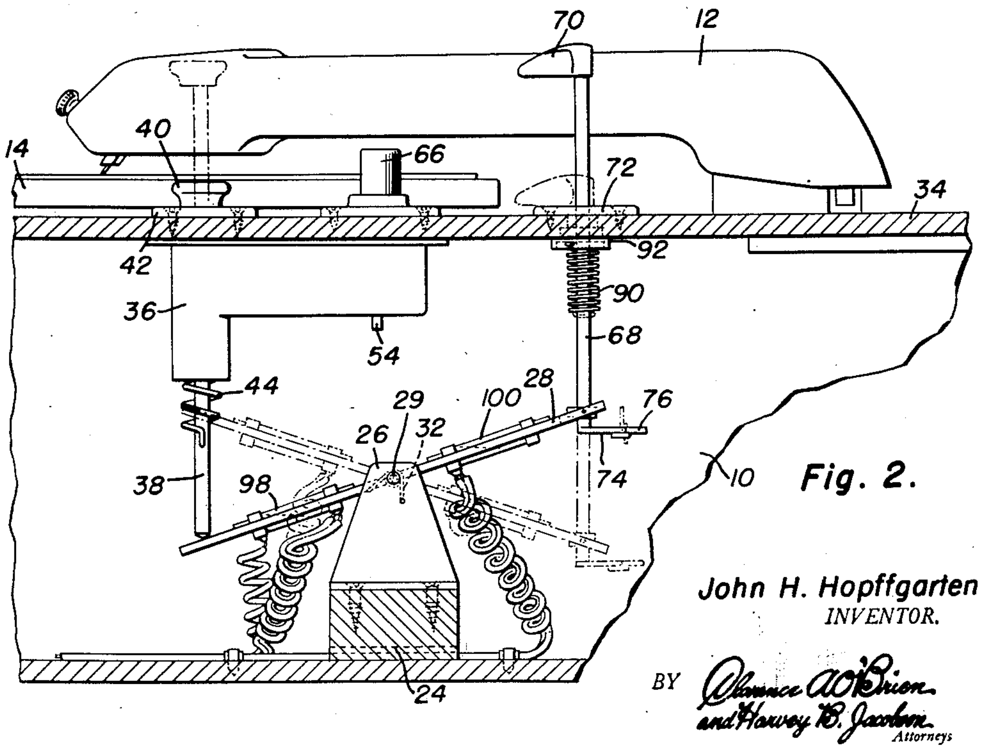
Figure 2 is a sectional view of the device shown in Figure 1, illustrating various details of construction.
Figure 3:
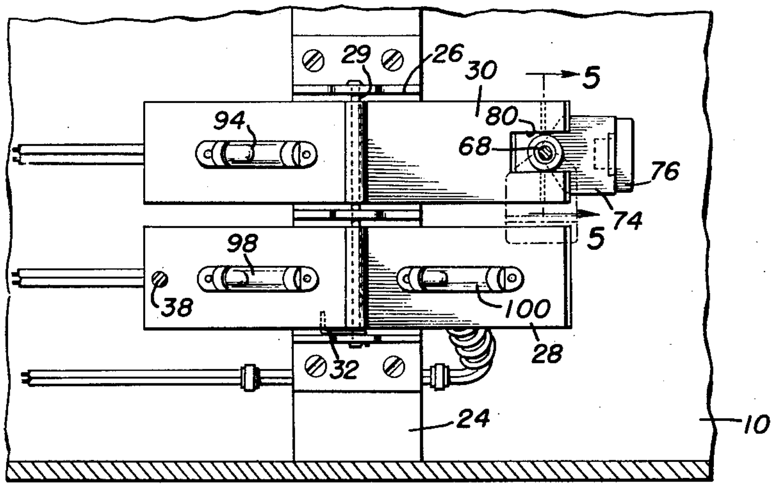
Figure 3 is another sectional view showing the preferred form of the invention in section and viewing the same from the top.

The lower portion of the push rod 68 has a foot generally indicated at 72 extending laterally therefrom. This foot includes an extension 74 which has a hinged plate 76 projecting outwardly from the extension 74. As is seen in Figure 2, the foot hinged portion 76 is capable of hinged actuation in a manner of approximately 90°, when in the full open position it projects as an element substantially parallel to the major plane of the extension 74.

A collar 78 is attached to the push rod 68 and is pivoted within a recess 80 at the end of the arm 30 by means of pivot pins 82 and 84 respectively. These pivot pins pivotally seat in the collar 78 and a ring 84 is slidable rotatively in the collar 78. Thus, the push rod may be reciprocatively actuated to pivotally actuate the arm 30 and also may be rotated in order to extend the foot to a position beneath one end of the pivoted arm 28. Accordingly, when in this last mentioned position, raising the push rod 68 will lift not only the pivoted arm 30 but also the pivoted arm 28. Conversely, pivotal actuation of the arm 28 will also pivotally actuate the arm 30 for various manipulations and various operational conditions.

There is means provided in association with the push rod 68 for urging the push rod to the full raised position. This means is a spring 90 which is attached at one end to the push rod and attached at the other end to a collar 92, which collar may be secured to the undersurface of the top 34.

The above described structure includes the mechanical portions and elements of the present invention utilized in the performance of the stated objects. The electrical portions include mainly the conventional elements of the radio-phonograph equipment with the addition of but a very few conductors and three switches.

Figure 6:
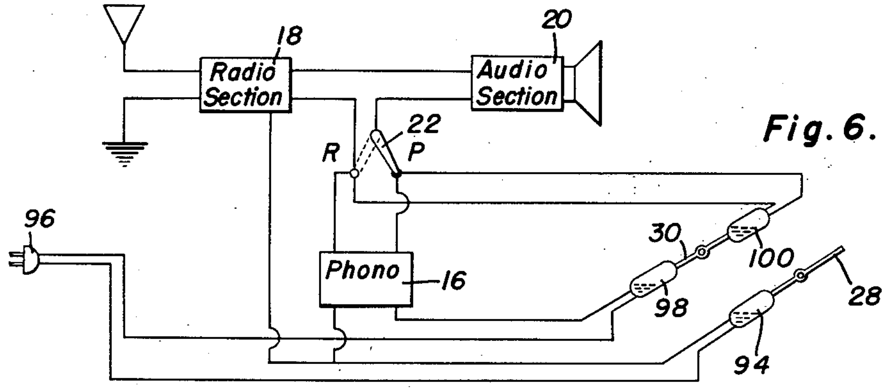
Figure 6 is a typical wiring diagram showing the invention applied to various mechanisms of a conventional phonograph-radio combination set.

As is seen in Figure 6 there is a single switch 94 which is schematically shown as mounted on the pivoted arm 28. It is quite obvious that the lines extending from the mercuric switch 94 are so located in the simple wiring diagram as to cut off the supply of current from a suitable source associated with the plug 96 when the circuit breaker of the mercuric type is open.

There are two mercuric switches 98 and 100 respectively mounted adjacent opposite ends of the arm 30 which are connected by means of electrical conductors to the phonograph turntable and audio section of the radio and to the radio reception section and audio section of the radio. The switch 22 is interposed in these lines in order to switch manually either the phonograph turntable and audio section or radio section and audio section. It is noted that the terminals of the switches 98 and 100 respectively are at opposed ends of each mercuric switch so that in accordance with the pivotal position of the arm 28, either one switch or the other is closed.

The operation of the device is as follows:

Upon completion of a recording which is of course mounted on the turntable, the swinging arm carrying the pickup mechanism by conventional means unshown carries the arm to a position at rest on the plunger head 66, releasing the latch mechanism and allowing the bar 38 to rise as it is urged by the spring 44. This rising permits the spring 32 to pivotally actuate the arm 28 thereby breaking the portion of the circuit having the mercuric switch 98 involved therein and completing the portion of the circuit having the switch 100 involved therein. Thus, the phonograph turntable motor is rendered inoperative (and if the pickup mechanism in the swinging arm 12 is electrically operative, a pair of simple leads may also be used in disconnecting a complete circuit thereto) and rendering the circuit complete which includes a radio reception section and the radio audio section. Accordingly, if the dial is properly set in order that the radio portion of the radio-phonograph combination would ordinarily play as a radio, reception on the radio solely is obtained.

In the event that it is desired to render both the radio and the phonograph portion of the set inoperative simultaneously upon completion of a single recording playing cycle of operation, the push rod 68 is rotated approximately 90° in order that the foot 76 engages the undersurface of the arm 28 and the arm 30 is rotated pivotally with the arm 28. Thus, the switch 94 is actuated thereby cutting off all current to any portion and all portions of the set.

While there has been described and illustrated but a preferred form of the invention, it is apparent that variations may be made without departing from the spirit thereof.

Having described the invention, what is claimed as new is:

1. A circuit breaker assembly comprising a housing which includes an upper and a lower panel, a bracket secured to said lower panel, a first and a second arm pivoted to said bracket, and switches carried by said arms, a spring reacting on said first arm and said bracket pivotally urging said first arm, a latch device secured to said upper panel holding said first arm pivoted to a position against the force of said spring, said latch device including a plunger engaging said first arm with means releasably holding said plunger in a selected position, a push rod reciprocatively passed through said upper panel, means rotatively connecting said push rod with said second arm to operate said second arm, and means on said push rod to engage and operate said first arm.

2. A circuit breaker assembly comprising a housing which includes an upper and a lower panel, a bracket secured to said lower panel, a first and a second arm pivoted to said bracket, and switches operatively connected with said arms, a spring reacting on said first arm and said bracket pivotally urging said first arm, a latch device secured to said upper panel holding said first arm pivoted to a position against the force of said spring, said latch device including a plunger engaging said first arm with means releasably holding said plunger in a selected position a push rod reciprocatively passed through said upper panel, and means rotatively connecting said push rod with said second arm to operate said second arm, a foot secured to said push rod and engaged with said first arm when said push rod is rotated so that both of said arms are operated simultaneously when said push rod is operated.

3. A circuit breaker assembly comprising a housing which includes an upper and lower panel, a bracket secured to said lower panel, a first and a second arm pivoted to said bracket, and switches operatively connected with said arms, a spring reacting on said first arm and said bracket pivotally urging said first arm, a latch device secured to said upper panel holding said first arm pivoted to a position against the force of said spring, said latch device including a plunger engaging said first arm with means releasably holding said plunger in a selected position, a push rod reciprocatively passed through said upper panel, means rotatively connecting said push rod with said second arm to operate said second arm, a foot secured to said push rod and engaged with said first arm when said push rod is rotated so that both of said arms are operated simultaneously when said push rod is operated, a plurality of notches in said plunger, a spring opposing the operation of said plunger, a latching bit slidable transversely of the plunger and releasably engageable with said notches to hold said plunger, and a cam operator operatively connected with said bit.

4. A circuit breaker assembly comprising a housing which includes an upper and a lower panel, a bracket secured to said lower panel, a first and a second arm pivoted to said bracket, and switches operatively connected with said arms, a spring reacting on said first arm and said bracket pivotally urging said first arm, a latch device secured to said upper panel holding said first arm pivoted to a position against the force of said spring, said latch device including a plunger engaging said first arm with means releasably holding said plunger in a selected position, a push rod reciprocatively passed through said upper panel, means rotatively connecting said push rod with said second arm to operate said second arm, a foot secured to said push rod and engaged with said first arm when said push rod is rotated so that both of said arms are operated simultaneously when said push rod is operated, a plurality of notches in said plunger, a spring opposing the operation of said plunger, a latching bit slidable transversely of the plunger and releasably engageable with said notches to hold said plunger, a cam operator operatively connected with said bit, a spring pressing said bit in said notches, and said plunger and said cam operator having portions of each passed through said upper panel for manual actuation purposes.

JOHN H. HOPFFGARTEN.

REFERENCES CITED

The following references are of record in the file of this patent:

UNITED STATES PATENTS

| Number | Name | Date |
|---|---|---|
| 613,356 | Conerly | Nov. 1, 1898 |
| 1,311,019 | Smith | July 22, 1919 |
| 1,584,358 | Dement | May 11, 1926 |
| 1,811,856 | Long | June 30, 1931 |
| 1,852,877 | Gardner | Apr. 5, 1932 |
| 1,852,878 | Gardner | Apr. 5, 1932 |
| 1,969,344 | Andrews | Aug. 7, 1934 |
| 1,992,047 | Spencer | Feb. 19, 1935 |
| 2,436,518 | Lieffers et al. | Feb. 24, 1948 |

FOREIGN PATENTS

| Number | Country | Date |
|---|---|---|
| 423,163 | Great Britain | Jan. 28, 1935 |